United States Patent [19]

Kearney

[11] 4,270,560
[45] Jun. 2, 1981

[54] PHOTO-ELECTRIC BURST DISC INDICATOR

[76] Inventor: John G. Kearney, 2624 Hamilton Blvd., South Plainfield, N.J. 07080

[21] Appl. No.: 95,597

[22] Filed: Nov. 19, 1979

[51] Int. Cl.³ ............................................. F16K 13/04
[52] U.S. Cl. .................................. 137/68 R; 137/557; 340/583; 116/268
[58] Field of Search ................. 137/68, 557; 340/303, 340/583, 590; 116/268, 270

[56] References Cited
U.S. PATENT DOCUMENTS

| 2,359,787 | 10/1944 | Peters | 340/583 X |
| 3,274,579 | 9/1966 | Fuller | 340/590 X |
| 3,770,918 | 11/1973 | Fortmann | 137/68 R X |
| 3,801,779 | 4/1974 | Ver Sluis | 340/583 X |
| 4,232,528 | 11/1980 | Behr | 340/583 X |

Primary Examiner—Harold W. Weakley
Attorney, Agent, or Firm—Robert K. Youtie

[57] ABSTRACT

A photo-electric pressure relief indicator for a fluid system wherein a housing is provided with an opening for connection in fluid communication with the system and provided with a vent spaced from the opening, a rupturable diaphragm extending across the housing to close communication between the opening and vent, a reflector on the diaphragm, and a photo-electric circuit reflecting from the reflector for sensing movement of the latter caused by rupture of the diaphragm.

8 Claims, 3 Drawing Figures

U.S. Patent  Jun. 2, 1981  4,270,560
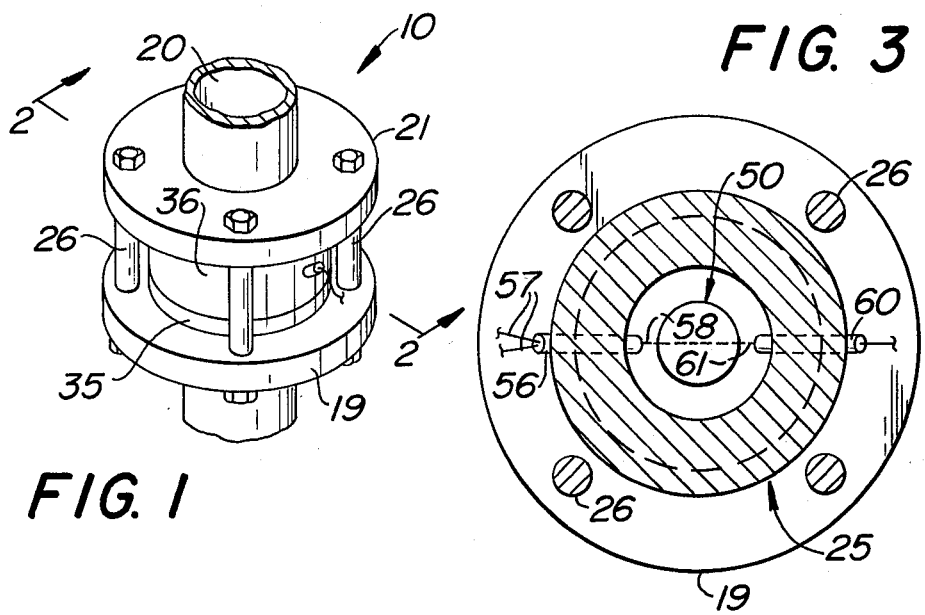
FIG. 1
FIG. 3
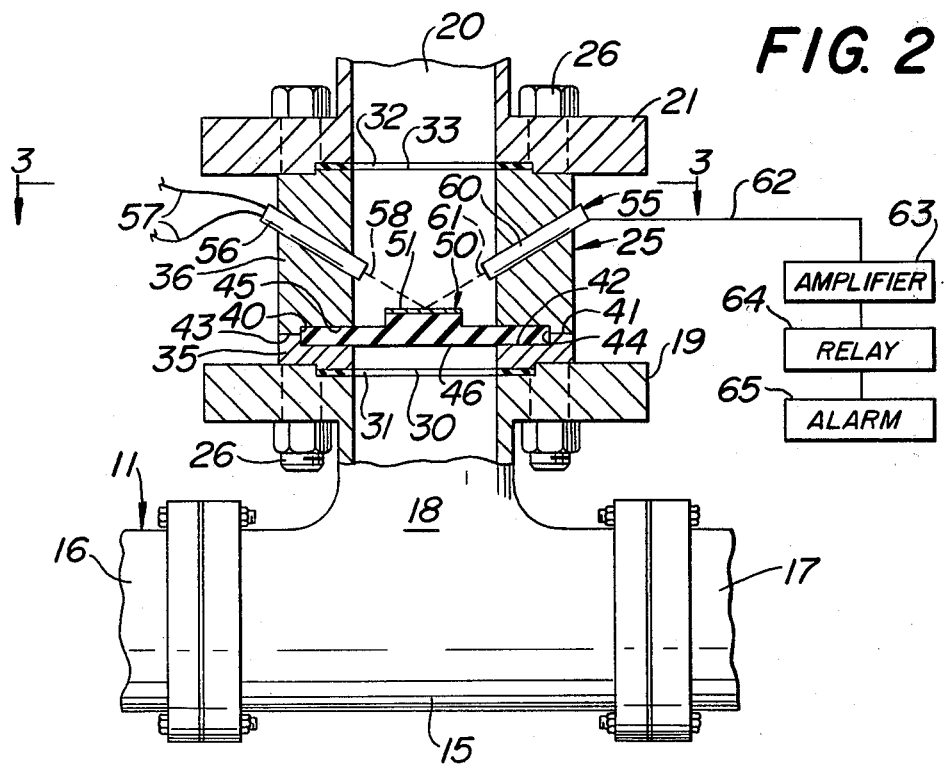
FIG. 2

PHOTO-ELECTRIC BURST DISC INDICATOR

CROSS-REFERENCES TO RELATED APPLICATIONS

This application is related to my co-pending U.S. patent application Ser. No. 1,957, filed Jan. 8, 1979.

BACKGROUND OF THE INVENTION

In the field of industrial safety concerning pressurized fluid systems, there have been provided a variety of pressure responsive overflow or relief devices, and the use of breakable or rupturable elements, frequently called burst discs have been found satisfactory. However, there has existed need for remote indication of burst disc rupture, particularly by electrically actuated signal means, while precluding the possibility of fire, explosion, or the like, from electrical current, and assuring high speed and reliability of operation with simplicity and economy in manufacture, installation and maintenance. The relief indicator of the present invention may be used in situations similar to that invisioned for the device of said co-pending patent application, but where a pneumatic source may not be available or desired, or electrical actuation is preferred. While there is no pertinent prior art known, the closest found are the following U.S. Pat. Nos. 3,216,611; 3,493,044; 3,770,918; 3,854,522; 3,902,515; 3,908,684; 3,915,235; 4,079,854; and 4,085,764.

SUMMARY OF THE INVENTION

Accordingly, it is an important object of the present invention to provide a pressure relief indicator device for use with burst discs, which is extremely simple in construction for economy in manufacture and installation, highly durable and entirely reliable throughout a long useful life, and which employs electrical operating means for quick, remote indication, and wherein the electrical means are effectively excluded from the fluid system to obviate or minimize the possibility of electrical hazard.

It is a further object of the present invention to provide a burst disc indicator of the type mentioned in the preceding paragraph which does not require an indpendent or separate fluid operating system, being capable of indication at a remote location as on a panel board or the like, and is readily adapted to be conveniently tested in its operative position without destruction or harm.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is an external perspective view showing a burst indicator constructed in accordance with the teachings of the present invention.

FIG. 2 is a longitudinal sectional view taken generally along the line 2—2 of FIG. 1 showing a burst disc indicator of the present invention in operative association with a fluid system, and schematically illustrating an associated electrical operating system.

FIG. 3 is a transverse sectional view taken generally along the line 3—3 of FIG. 2.

DESCRIPTION OF THE PREFERRED EMBODIMENT

Referring now more particularly to the drawings, and specifically to FIG. 1 thereof, a pressure relief device or burst disc indicator of the present invention is there generally designated 10, and is shown in FIG. 2 as applied to a fluid pressure system or conduit 11. Of course, the pressure relief indicator of the present invention may be applied at any desired location to a fluid pressure system, say in the piping thereof, as illustrated, directly to a pressure vessel or tank, or otherwise, all of which environmental associations are intended to be comprehended herein.

The specific illustrated conduit or system 11, see FIG. 2, may include a Tee section 15 interposed between pipe sections 16 and 17 and provided with an upstanding stem portion 18 including a flange 19.

A vent section 20 may be generally tubular and is located in generally aligned relation with stem 18, being spaced over the latter and provided with a flange 21 in facing relation with respect to and spaced over the stem and flange 19.

Interposed between the flanges 19 and 21 is a generally tubular housing 25, which is generally aligned with stem 18 and vent section 20, being secured in position between flanges 19 and 21 by a generally circular array of tie members or bolts 26 extending between the flanges at spaced locations about the housing.

The housing 25 may be generally tubular, as illustrated, having at its lower end an opening 30 proximate to and in alignment with the flange 19 of stem 18 for communication therethrough with the system 11. A suitable gasket 31 may be interposed in sealing engagement between the lower housing end 30 and the flange 19. The upper end of tubular housing 25 may be provided with an outlet opening or vent 33 in fluid communication with the vent section 20; and, an upper end gasket 32 may be interposed in sealing relation between the upper housing end 33 and the flange 21 of vent 20.

The tubular housing 25 may be constituted of a plurality of annular, tubular pipe-like sections 35 and 36 superposed in aligned relation with respect to each other and with the lower stem 18 and upper vent 20. The lower housing section 35 seals against gasket 31, while the upper housing section 32 seals against gasket 33. The upper side of the lower housing section is formed with an annular recess 40 opening radially inwardly through the generally cylindrical surface of the lower section 35, and opening upwardly through the upper or top annular surface 41 of the lower housing section 35. Thus, the recess 40 defines an annular, internal, upwardly facing shoulder 42. Conversely, the lower end or underside 43 of upper housing section 36 is formed with an annular, internal, downwardly facing recess 44 defining an annular, internal downwardly facing shoulder 45. The shoulder 45 is in downwardly facing, spaced relation with respect to the upwardly facing shoulder 42.

The upwardly facing recess 40 receives the lower portion of the circumferential margin of a generally circular plate or burst disc 46. The upper portion of the circumferential margin of burst disc 46 is received in the downwardly facing recess 44. Thus, there is an interfitting relationship which effectively maintains alignment between the housing sections 35 and 36; and further, the burst disc 46 may be of a thickness relative to the combined dimensions of annular recesses 40 and 44 so as to fully occupy the latter and define an effective seal thereabout. In this manner, the burst disc 46 entirely occludes or closes the housing 25 to fluid communication therethrough, as between the lower end opening 30 and upper end vent 33.

The burst disc 46 may advantageously be fabricated of graphite, suitably compounded and designed to afford a particular desired rupture strength. That is, the rupture disc 46 is selected having the characteristic of bursting or rupturing under a predetermined fluid pressure.

On the upper side of the rupture disc 46, away from and out of communication with the fluid system 11, there is provided suitable reflective means 50, such as a reflector 51 which may be generally flat, disposed in a plane parallel to that of the disc, and facing generally upwardly. While this structure of the reflected element 51 is relatively simple, having the advantages thereof, there may be certain circumstances requiring other reflective means.

A photo-electric circuit is generally designated 55, and is associated with the reflective means 50 to sense a change in position of the reflective means, as by breakage or rupture of the burst disc 46.

More specifically, the photo-electric means 55 may include a light source or lamp 56 connected to an electrical supply, as by conductors 57. The light source 56 may extend through the wall of housing section 36, above the reflective means 50, directing its light rays toward the reflective means, as at 58. As illustrated, it is advantageous that the light source 56 extend exteriorly of the housing section 36 for electrical connection exteriorly of the housing to the supply lines 57.

The photo-electric circuitry 55 further includes a photocell 60 mounted in a wall region of the housing section 36 and located to receive reflected light rays, as at 61, from the reflective means 50. Thus, the photocell 60 is located to receive the light rays 61 interiorly of the housing 25, and extends through the wall of housing section 36 exteriorly thereof for electrical connection, as by suitable terminal means, to conductor means 62. The photocell 60 thereby continuously receives a signal from reflected light rays 61, which signal is transmitted by conductor 62 to an amplifier 63, and in turn transmitted to a relay 64 to hold the latter in. The relay is connected to an alarm 65 such that when the relay is no longer pulled in, the alarm is activated. The alarm may, of course, be at any desired proximate or remote location, and may constitute any preferred form of alarm, such as visible or audible, or other.

In the preferred embodiment it will be observed that, see FIG. 3, the light source 56 and photocell 60 are located in generally diametrically opposed relation for emitting and receiving the generally diametrically extending light rays 58 and 61. However, the light source and photocell may be located otherwise, if desired, say both on the same side of the housing 25 if conditions require, and the reflective means 50 appropriately contoured and arranged to reflect light from the source to the photocell.

While it is appreciated that interruption of the reflected light to the photocell 60 will energize and alarm, it will also be understood that the indicator system may be simply tested by merely momentarily disconnecting the light source from its supply, as by a remote switch. Of course, rupture of the burst disc 46 removes the reflective means 50 to interrupt the light reflected to photo-electric cell 60 and effect the desired alarm actuation. However, as electrical termination of both the light source 56 and photo-electric cell 60 are exteriorly of the housing 25, maximum saftey is achieved.

From the foregoing, it is seen that the present invention provides a pressure relief indicator device which is extremely simple in construction, entirely reliable in operation, and otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A pressure relief for a fluid system comprising a housing having an opening connected in fluid communication with the system and a vent spaced from the opening, a diaphragm extending in closing relation across said housing for closing the housing to the passage of fluid, said diaphragm rupturing under a predetermined pressure to vent said system, reflective means on said diaphragm remote from said opening, and photo-electric means optically associated with said reflective means for sensing the rupture of said diaphragm.

2. A pressure relief according to claim 1, said photo-electric means including a light source carried by said housing for directing light to said reflective means, and a photocell carried by said housing for receiving light reflected from said reflective means, said light source and photocell extending exteriorly of said housing for electrical termination without exposure to the fluid system.

3. A pressure relief according to claim 1, said housing being generally tubular with said opening and vent at opposite ends.

4. A pressure relief according to claim 3, said diaphragm extending across said tubular housing generally normal to the axis thereof.

5. A pressure relief according to claim 4, said diaphragm being fabricated of graphite.

6. A pressure relief according to claim 4, said reflective means being generally parallel to the plane of said diaphragm.

7. A pressure relief according to claim 6, said photo-electric means comprising a light source carried by said housing, and a photocell carried by said housing generally diametrically opposed to said light source.

8. A pressure relief according to claim 7, said light source and photocell extending externally of said housing for electrical termination without exposure to the fluid system.

* * * * *